United States Patent [19]
Leini et al.

[11] Patent Number: 5,426,854
[45] Date of Patent: Jun. 27, 1995

[54] CHAIN SAW GUIDE BAR WITH LIQUID SPRAY DEVICE

[75] Inventors: Arvo Leini, Edsbyn; Karl Olof Pettersson, Voxnabruk; Per-Olof Löfgren, Vallsta; Staffan Lindberg, Edsbyn, all of Sweden

[73] Assignee: Sandvik AB, Sandviken, Sweden

[21] Appl. No.: 184,450

[22] Filed: Jan. 21, 1994

[30] Foreign Application Priority Data

Jan. 22, 1993 [SE] Sweden .............................. 9300180

[51] Int. Cl.⁶ .............................................. B27B 17/02
[52] U.S. Cl. ...................................... 30/123.4; 30/387
[58] Field of Search ...................... 30/123.4, 383, 387, 30/123.3

[56] References Cited

U.S. PATENT DOCUMENTS

| | | | |
|---|---|---|---|
| 2,032,303 | 3/1936 | Arsneau | 30/124.4 |
| 5,050,303 | 9/1991 | Sinclair et al. | 30/383 |
| 5,056,224 | 10/1991 | Seigneur | 30/123.4 |
| 5,143,131 | 9/1992 | Seigneur et al. | 30/123.4 |

*Primary Examiner*—Kenneth E. Peterson
*Attorney, Agent, or Firm*—Burns, Doane, Swecker & Mathis

[57] ABSTRACT

A chain saw guide bar allowing spraying of the cut surface of a stump with liquid, is made from three joined plates with a spraying device comprising one or more supply channels provided as cutouts in the central plate. A plurality of spraying holes are provided in one or both side plates. The spraying holes are offset towards the guide bar edge so far that less than the entire area of spraying hole area overlaps the edge of the supply channel.

7 Claims, 1 Drawing Sheet

CHAIN SAW GUIDE BAR WITH LIQUID SPRAY DEVICE

BACKGROUND AND SUMMARY OF THE PRESENT INVENTION

During felling of timber with chain saws carried on harvester machines, it is common practice to spray the cut surface of the stump with a liquid such as an urea aolution to avoid fungal infections which can spread through the roots to neighboring standing trees. Guide bars for such liquid spray treatment are described in SE Patent No. 76 04765-3, SE Patent No. 76 11822-3, and U.S. Pat. No. 5,050,303.

The majority of guide bar designs for such treatment spray the liquid vertically from the lower surface of the guide bar through holes located near the line of symmetry, or from an elongated indentation in the surface. This means that in order to spray the entire cut surface of the stump the guide bar has to pass so far through the tree trunk that the holes reach the edge of the cut surface, which means that the cutting chain reaches around 10 mm past that edge. This means an excess time requirement, an excess demand for mobility of the guide bar and a risk that the tree trunk will settle down on the guide bar, preventing its return to the starting position, jamming or breaking the cutting chain or lifting the chain off the guide bar.

In another suggested design, the liquid is emitted through the chain groove to be spread over the stump surface by the chain links, with the disadvantage of degrading the chain lubrication oil and of wastefully spraying liquid outside the cut surface of the stump.

The present invention relates to a guide bar structure with a liquid spraying device comprising holes formed and located to disperse the liquid evenly in a direction more parallel to the surface of the guide bar to hit the cut surface in front of the holes in the guide bar structure, to save time and liquid, and to lower the risk of jamming.

A guide bar according to the invention has on its underside a plurality of holes connected to a channel within an interior of the guide bar for liquid supply. The guide bar is preferably reversible, having holes on both sides and two separate supply channels.

According to the present invention the guide bar is made from two side plates and one center plate joined by welding. The supply channels are cutouts in the center plate, and may be lined with thin-waiied tubes to avoid leakage. Near the machine attachment end of the guide bar, the channel is terminated at an opening in one side plate matching a supply opening in the clamping surface of the machine, through which liquid can be supplied from a pump and container on the machine.

According to the invention the spraying holes in the side plates are made as cutouts which are offset from the supply channels so far that less than half, preferably less than a fifth, of the area of the hole is overlapping the supply channel near its edge. This offset causes the liquid to emerge not as a narrow jet vertical to the sideplate surface, but with a velocity component along the sideplate surface, and with an angular spread to cover the cut surface evenly with a minimum amount of liquid.

Compared to the supply channels, the spraying holes are located closer to the leading edge of the guide bar, where the cutting part of the chain runs. This directs the liquid towards the chain, and each element of the cut surface is covered with liquid very soon after the passage of the chain and before the holes move past the element. This arrangement limits the requirement of angular mobility of the guide bar, and improves safety and productivity.

BRIEF DESCRIPTION OF THE DRAWINGS

While not limiting, the invention is more closely described with reference to the figures wherein like members bear like reference numerals, and wherein.

DETAILED DESCRIPTION OF THE PREFERRED EMBODIMENT

Figure 1:
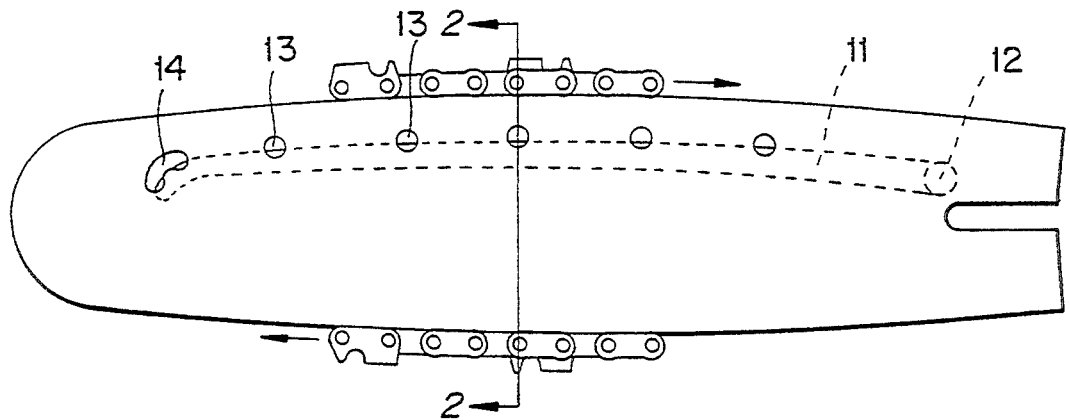
FIG. 1 is a view of the underside of a guide bar.

FIG. 1 shows the supply channel (11) which conveys the liquid from an opening (12) on the upper side of the guide bar to a plurality of spraying holes (13, 14) on the underside of the guide bar. The spraying holes may be round (13) which is easily manufactured, or shaped (14) to achieve special spreading patterns, which may be desirable close to a nose of the guide bar.

Figure 2:
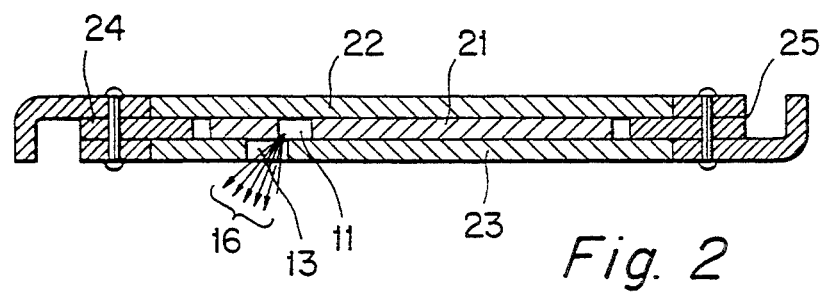
FIG. 2 is a cross-sectional view through the guide bar according to the present invention through a spraying hole.
Figure 3:
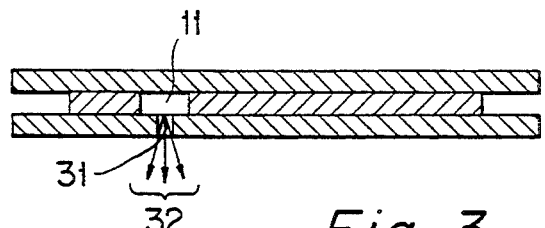
FIG. 3 is a cross-sectional view through a guide bar according to prior art.

As shown in FIG. 2 the supply channel (11) is made as a cutout in the center plate (21) (FIG. 2) and the spraying hole (13) as a cutout in the lower side plate (23). Only a small pan of the spraying hole (13) overlaps the edge of the supply channel (11), giving the emerging liquid (16) a velocity component towards the cutting part (24) of the saw chain. The stump surface cut by the chain will then be sprayed with liquid very soon after the cutting pan (24) of the chain has passed, and there is no need to move the guide bar as far as if the guide bar were of prior art shown in FIG. 3 where the liquid (32) emerges as a jet vertical to the side plate from a small hole (31) wholly facing the supply channel. This eliminates the risk of jamming of the non-cutting pan (25) of the chain after severing of the tree trunk, and of lifting the cutting part (24) from the chain groove when the guide bar returns to starting position. If the guide bar is reversible, there is provided another supply channel connecting to spraying holes in the side plate (22) facing upwards as seen in FIG. 2.

Figure 4:
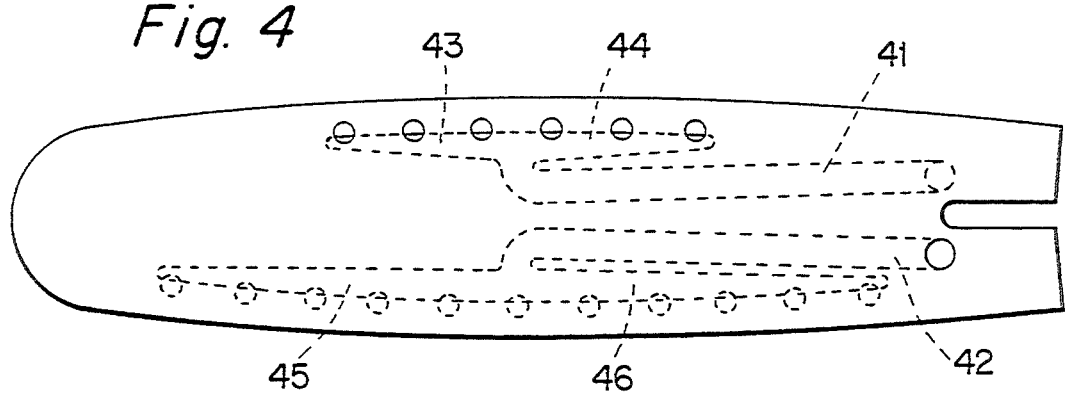
FIG. 4 is a view of the underside of a guide bar illustrating an alternative form of the supply channels according to the present invention.

To get the most even liquid distribution possible among the spraying holes (13), it is advantageous in a preferred embodiment to make the supply channel (41) branching as shown in FIG. 4, with one forward branch (43) and one rearward branch (44), where the branches can be made with a cross section area diminishing in the direction of the liquid flow. In a guide bar with an unbranched supply channel (11) as shown in FIG. 1, the whole channel can be made with decreasing cross section from the rearmost hole. It can also be advantageous to locate the spraying holes with varying distances, or to make the supply channel (11) or its forward branch (43) curved to follow the curvature of the forwards narrowing guide bar.

If the guide bar is to be used for trees of greatly varying mean diameters, the guide bar can be made reversible with different spraying hole patterns on either side as shown in FIG. 4, with one side spread over a greater length (45, 46) for large diameters, and with a second side spread over a smaller length (43, 44) for smaller diameters. This reduces the amount of liquid wasted outside the cut surface of the stump.

Guide bars with liquid spraying devices comprising supply channels and spraying holes according to the invention can also include other channels of known types for lubricant or marking paint. The channels and holes of the invention can be produced by blanking, milling, laser cutting, spark erosion or other know methods.

The principles, preferred embodiment and mode of operation have been described in the foregoing. However, the invention which is intended to be protected is not limited to the specific embodiments disclosed but rather is defined by the appended claims.

What is claimed is:

1. A chain saw guide bar allowing spraying of the cut surface of the stump with liquid, comprising a guide bar made by joining one central plate and two side plates, the central plate containing one or more supply channels, at least one of the side plates containing a plurality of spraying holes, the supply channels being cutouts in the center plate and the spraying holes being cutouts in the at least one of said side plates, said spraying holes having an area and being transversely offset towards an edge of the guide bar to overlap the supply channels with only a fraction of the area of the spraying holes such that said liquid spray is oblique to said plates.

2. The chain saw guide bar according to claim 1, wherein the supply channels include branches, each channel having forward and rearward branches.

3. The chain saw guide bar according to claim 2, wherein the branches have diminishing cross section in a direction of liquid flow.

4. The chain saw guide bar according to claim 1, wherein the supply channel has a forwardly diminishing cross section.

5. The chain saw guide bar according to claim 1, wherein the spraying holes are provided in both side plates, the spraying holes in one side plate being spread over a greater length than the spraying holes in the other side plate.

6. The chain saw guide bar according to claim 1, wherein the supply channels are permanently lined with tubes.

7. The chain saw guide bar according to claim 1, wherein the spraying holes are offset by at least one half the area of the spraying holes.

* * * * *